(12) United States Patent
Foti

(10) Patent No.: US 8,694,972 B2
(45) Date of Patent: Apr. 8, 2014

(54) SYSTEM AND METHOD FOR INTEROPERATING WITH FOREIGN OBJECTS FROM A SINGLE LANGUAGE COMPUTING ENVIRONMENT

(75) Inventor: David A. Foti, Tolland, CT (US)

(73) Assignee: The MathWorks, Inc., Natick, MA (US)

( * ) Notice: Subject to any disclaimer, the term of this patent is extended or adjusted under 35 U.S.C. 154(b) by 1245 days.

(21) Appl. No.: 11/595,551

(22) Filed: Nov. 10, 2006

(65) Prior Publication Data

US 2008/0114804 A1    May 15, 2008

(51) Int. Cl.
*G06F 9/44* (2006.01)
(52) U.S. Cl.
USPC .......................................... 717/136; 707/602
(58) Field of Classification Search
USPC .......................................... 717/136; 707/602
See application file for complete search history.

(56) References Cited

U.S. PATENT DOCUMENTS

| | | | | |
|---|---|---|---|---|
| 4,736,321 | A * | 4/1988 | Brown et al. | 719/313 |
| 5,274,821 | A * | 12/1993 | Rouquie | 717/139 |
| 5,315,709 | A * | 5/1994 | Alston et al. | 1/1 |
| 5,732,270 | A * | 3/1998 | Foody et al. | 719/316 |
| 6,134,559 | A * | 10/2000 | Brumme et al. | 1/1 |
| 6,182,154 | B1 * | 1/2001 | Campagnoni et al. | 719/315 |
| 6,851,108 | B1 | 2/2005 | Syme et al. | |
| 7,783,720 | B1 * | 8/2010 | Allavarpu et al. | 709/218 |
| 2004/0083464 | A1 | 4/2004 | Cwalina et al. | |
| 2005/0160413 | A1 * | 7/2005 | Broussard et al. | 717/148 |

FOREIGN PATENT DOCUMENTS

WO      WO-96/08765 A1    3/1996

OTHER PUBLICATIONS

International Search Report for Application No. PCT/US2007/023710, dated Jun. 2, 2008.
European Office Action for Application No. 07861926.9, dated Dec. 23, 2011.

\* cited by examiner

*Primary Examiner* — Li B Zhen
*Assistant Examiner* — Lenin Paulino
(74) *Attorney, Agent, or Firm* — Nelson Mullins Riley & Scarborough LLP

(57) ABSTRACT

A mechanism for providing automatic interoperation between native objects created in a single language computing environment and objects created in external virtual machines and foreign class systems is discussed. Embodiments of the present invention provides a class definition syntax for objects created in the single language computing environment that provides the ability to directly subclass external classes and implement external interfaces. One embodiment of the present invention also permits a foreign object system to instantiate native objects and to create foreign subclasses of native classes. More specifically, one embodiment of the present invention provides bidirectional mapping between metadata associated with objects created with each of a plurality of different types of foreign object systems and metadata created in a form supported by the single language computing environment.

18 Claims, 7 Drawing Sheets

SYSTEM AND METHOD FOR INTEROPERATING WITH FOREIGN OBJECTS FROM A SINGLE LANGUAGE COMPUTING ENVIRONMENT

BACKGROUND

Object-oriented systems instantiate objects based on class definitions. The class definitions specify what features are common to every instance of a class. Recently, it has become common in languages like Microsoft C# for class definitions to specify at least three types of features—properties or data, functions or methods, and events or messages. Additionally, certain object systems create well defined metadata associated with each class that can be used by other objects in the object system to interact with objects from other object systems that were not previously known. Single language computing environments ordinarily support communication only with native objects instantiated from their native language class definitions.

Virtual machines are self-contained operating environments that behave as if they are separate computing devices. For example, a Java virtual machine (VM) implements a Java object system while a Microsoft .NET Framework implements the .NET object system. In a Java VM, all objects are defined by the Java language. In a .NET VM, objects may be defined by a number of different languages including C# and C++, but all such class definitions must be compiled to produce object code and meta-data compatible with the .NET Common Language Runtime (CLR). Certain foreign objects can be created and manipulated within a virtual machine using special APIs or by creating an adapter class that is compiled in the native environment of the VM but communicates with a foreign object.

Unfortunately, problems may arise when it becomes necessary for an object in a single language computing environment to communicate with objects created in a virtual machine's foreign object system that uses a different kind of meta-data or with objects created in a foreign class system. Generally, it is not possible to work with foreign classes that are not specifically compiled to work with the native object system or else interaction with the foreign objects is limited to communication through a special API, such that the foreign objects do not behave as if they were native objects. For example, it may be possible to construct a foreign object through an interface, but the syntax is different from that used to construct a native object. It may not be possible to create a subclass of a foreign class such that the subclass belongs to the native class system. For example, the MATLAB R12 modeling environment may provide a feature for creating a subclass of a Java class, but this subclass belongs to a special object system separate from the regular native object system. Similarly, MATLAB R12 also does not permit Java to subclass a MATLAB class.

In addition to foreign object systems not using the same meta-data as the native object system, foreign object systems frequently use different memory management and different physical layouts to store data belonging to objects. Typically, languages like C++ and Java, and object systems like the Microsoft Common Language Runtime (CLR) require that all objects conform to certain requirements on how their data is managed in memory. Language syntax native to these languages and systems is expected to be compiled directly to code based on and assuming the standard memory management system. This approach may make it difficult to use native language syntax to manipulate foreign objects which may use different memory layout, different memory managers, or even different memory devices.

BRIEF SUMMARY

The illustrative embodiment of the present invention provides a mechanism for automatic interoperation between native objects created in a single language computing environment and objects created in external virtual machines and foreign class systems. One embodiment of the present invention is directed to a class definition syntax for objects created in the single language computing environment that provides the ability to directly subclass external classes and implement external interfaces. Another embodiment of the present invention also permits a foreign object system to instantiate native objects and to create foreign subclasses of native classes. More specifically, an embodiment of the present invention provides bidirectional mapping between metadata associated with objects created with each of a plurality of different types of foreign object systems and metadata created in a form supported by the single language computing environment. A native metadata wrapper is created for each foreign class that is to be accessed in the single language environment. Similarly, a foreign class metadata wrapper is created for each native class that is to be provided to a foreign object system or external virtual machine. The native object system makes no assumptions about the memory management or data storage system used by any of its class instances. Accordingly, foreign objects that may use different kinds of storage or memory layouts may be accessed in the same manner as native objects.

In one embodiment of the present invention a method of supporting interoperation between a single language computing environment and objects created in foreign object systems includes the step of obtaining a class definition in a single language computing environment having a native object system. The class definition supports an instantiation of objects accessible in the single language computing environment from classes defined in multiple types of foreign object systems. The method also examines the metadata of a foreign class created in a foreign object system. The first foreign object system is different from the native object system. The metadata describes how to access an instance of the foreign class. Additionally, the method creates metadata corresponding to the metadata for the foreign class that is in a form supported by the single language host computing environment. The method also instantiates a first object instance in the single language host computing environment using the class definition. The first object instance references the created metadata and the instance of the foreign class.

In another embodiment of the present invention a method of supporting interoperation between a single language computing environment and objects created in multiple types of foreign object systems includes the step of obtaining a class definition for a native class in a single language computing environment. The class definition supports the instantiation of objects accessible in multiple different types of foreign object systems. The method also examines a collection of metadata of the native class created in the single language computing environment. The metadata describes how to access the native object instance. Additionally, the method creates metadata corresponding to the metadata for the native class. The created metadata is created in a form supported by an identified foreign object system. The method also instantiates a first object instance in a form supported by the identified foreign object system using the class definition. The first object instance references the created metadata and the native object instance.

In one embodiment of the present invention, a computing device implemented system for supporting interoperation between a single language computing environment and objects created in multiple types of foreign object systems includes a class definition in a single language computing environment having a native object system. The class definition supports the instantiation of objects accessible in multiple different types of foreign object systems and the instantiation of objects accessible in the single language computing environment from objects created in multiple different types of foreign object systems. The system also includes a mapping facility in the single language computing environment. The mapping facility provides bidirectional mapping between metadata associated with objects created with each of multiple different types of foreign object systems and metadata created in a form supported by the single language host computing environment. The mapping facility examines the metadata of a foreign class created in a foreign object system. The metadata describes how to access an instance of the foreign object system. The mapping facility also creates metadata corresponding to the metadata for the first foreign class in a form supported by the single language host computing environment. The system additionally includes a first object instance that is instantiated using the class definition and references the created metadata and the first foreign object instance.

In an embodiment of the present invention, a computing device implemented system for supporting interoperation between a single language computing environment and objects created in multiple types of foreign object systems includes a class definition in a single language computing environment having a native object system. The class definition supports the instantiation of objects accessible in multiple different types of foreign object systems. The system also includes a mapping facility in the single language computing environment. The mapping facility provides bidirectional mapping between metadata associated with objects created with each of multiple different types of foreign object systems and metadata created in a form supported by the single language host computing environment. The mapping facility examines the metadata of a native object class created in the single language computing environment. The metadata describes how to access an instance of the native object class. The mapping facility also creates metadata corresponding to the metadata for the native class. The created metadata is created in a form supported by an identified foreign object system. The system additionally includes a first object instance that is instantiated using the class definition and references the created metadata and the native object instance.

In another embodiment of the present invention, a method of supporting interoperation between a single language computing environment and objects created in foreign object systems includes the step of obtaining a native class in a native object system. The native class defines a native metaclass describing how to access a collection of data defined by the native class and a collection of data associated with an instance of the native class. The method also identifies a foreign metaclass for a foreign class created in a foreign object system. The foreign metaclass defines metadata describing how to access a collection of data defined by the foreign class and a collection of data associated with an instance of the foreign class. The method also subclasses the foreign metaclass as a subclass of the native class and instantiates, in the single language computing environment, an instance of the subclass. The instance of the subclass references metadata describing how to access the collection of data associated with the instance of the foreign class.

In one embodiment of the present invention, a method of supporting interoperation between a single language computing environment and objects created in foreign object systems includes the step of obtaining a native class in a native object system. The native class defines a native metaclass describing how to access a collection of data defined by the native class and a collection of data associated with an instance of the native class. The method also identifies a foreign metaclass for a foreign class created in a foreign object system. The foreign metaclass defines metadata describing how to access a collection of data defined by the foreign class and a collection of data associated with an instance of the foreign class. The method also subclasses the native metaclass as a subclass of the foreign class and instantiates, in the foreign object system, an instance of the subclass. The instance of the subclass references metadata describing how to access the collection of data associated with the instance of the native class.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

One embodiment of the present invention provides a mechanism for programmatic interoperation between multiple external virtual machines operating foreign object systems and/or foreign class systems and a single language computing environment. The interoperation provided by an embodiment of the present invention includes the ability to dynamically project metadata from one metadata definition into multiple additional metadata definitions. The ability to project the metadata allows individual class instances to be simultaneously represented and manipulated from multiple virtual machines or class systems.

Figure 1:
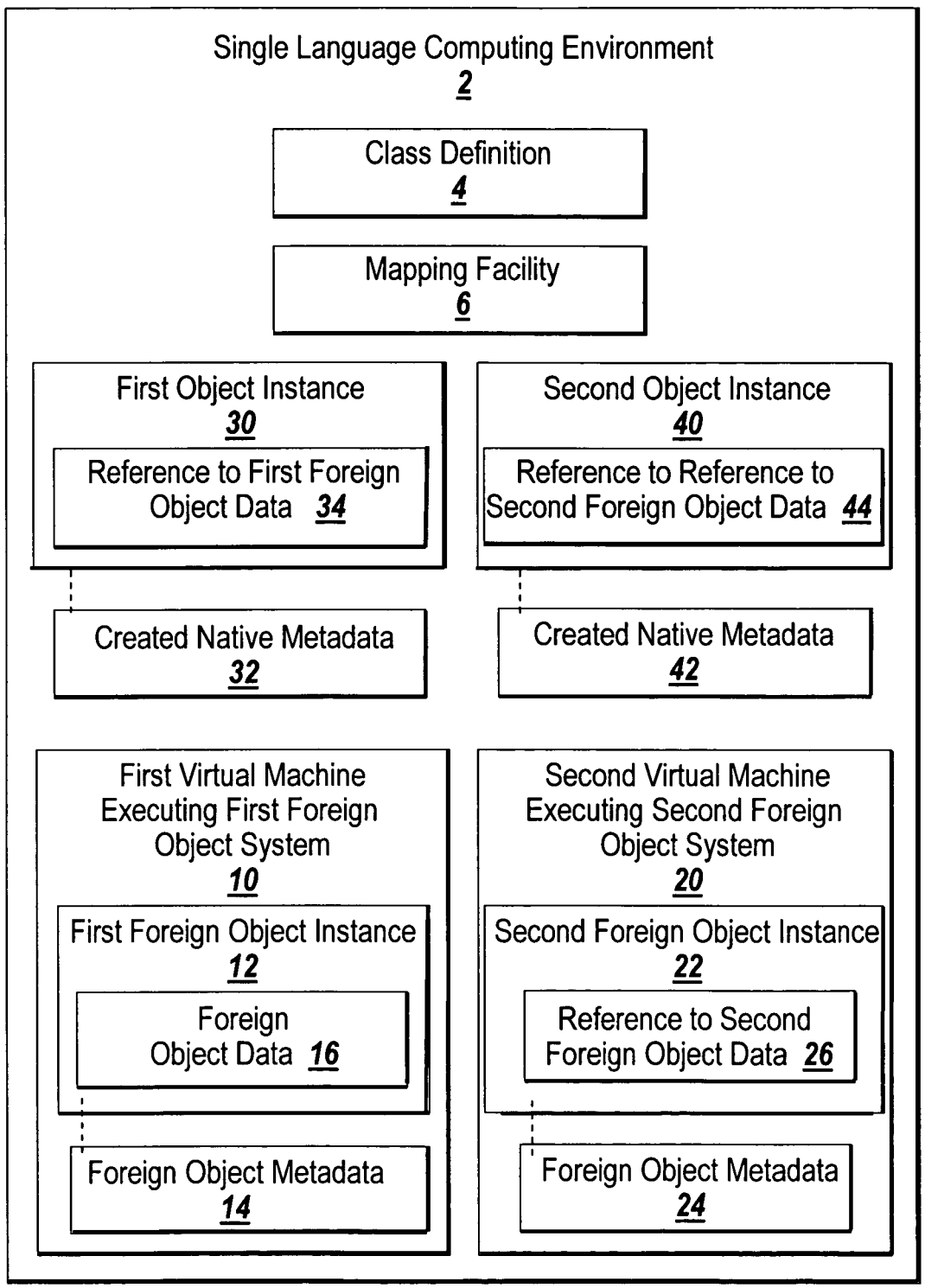
FIG. 1 depicts an environment suitable for practicing an illustrative embodiment of the present invention in order to programmatically instantiate native objects from foreign objects.

FIG. 1 depicts an environment suitable for practicing an illustrative embodiment of the present invention. A single language computing environment 2 on a computing device includes a class definition 4 and mapping facility 6. An exemplary single language computing environment is MATLAB from The MathWorks, Inc. of Natick, Mass. It will be appreciated by those skilled in the art that the techniques of the embodiments the present invention may be practiced in other single language computing environments instead of MATLAB without departing from the scope of the present invention. The computing device hosting the single language computing environment 2 may be a workstation, server, laptop, mainframe, PDA or other computing device equipped with a processor and able to support the single language computing environment 2. The computing device may have a single processor or multiple processors and each of the processors may have one core or multiple cores.

The class definition 4 utilized by one embodiment of the present invention to instantiate new objects provides the ability to directly subclass external classes created by foreign object systems and to implement external interfaces so that native objects may be utilized in foreign object systems. The class definition 4 utilizes the output of a mapping facility 6 which provides bidirectional mapping between metadata associated with objects created with different types of foreign object systems and metadata native to the single language host computing environment. The metadata describes for each object an interface indicating how to access data, or a reference to data, included in an object. The mapping facility 6 has access to a record of the form of metadata used by well-defined metadata systems and maps the metadata used to the corresponding metadata for the native object system.

The single language computing environment 2 may load a first virtual machine executing a foreign object system 10 and a second virtual machine executing a second (and different) foreign object system 20 (the term "foreign object system" as used herein is intended to encompass both object systems hosted by virtual machines and foreign class systems created in non-virtualized foreign language environments). Exemplary virtual machines include Java virtual machines, Smalltalk virtual machines and .NET virtual machines. The first virtual machine executing a foreign object system 10 may include at least a first foreign object instance 12 that includes foreign object data 16 and is referenced by foreign object metadata 14. The foreign object metadata 14 defines an interface for objects of the foreign object system that allows access to the foreign object data 16. Similarly, the second virtual machine executing the second foreign object system 20 may include a second foreign object instance 22 that includes a reference to second foreign object data 26 and is referenced by foreign object metadata 24. The reference to foreign object metadata may be a pointer to a location holding a collection of foreign object data. It will be appreciated that an object instance may include a structure holding data or a reference (such as a pointer) to another location for the data. Although reference has been made to the loading of the first virtual machine 10 and second virtual machine 20 (with each virtual machine executing a distinct foreign object system) by the single language computing environment 2, it should be recognized that the foreign object systems may be located on separate computing devices from the single language computing environment 2 and that the foreign object systems may be class systems executing on other physical computing devices rather than being hosted in virtual machines.

A type of the foreign object system associated with the metadata for a foreign object instance 12 and 22 is identified by the mapping facility 6. The form of the metadata associated with the foreign object instance 12 and 22 is compared by the mapping facility 6 to its records of different types of metadata. It should be noted that many objects from the same class may be instantiated and use the same metadata. The metadata is created once per class rather than once per instance. It will be appreciated that the metadata may also be created on a per instance basis in an alternate embodiment of the invention. Once the type of object system that spawned the metadata has been identified, the mapping facility 6 creates the corresponding metadata for the native object system supported by the single language computing environment 2. The created metadata is then used with the class definition so that new objects may be created that reference the foreign object data. Thus, the mapping facility 6 creates new native metadata 32 that corresponds to the first foreign object metadata 14. The foreign metadata may be used to learn how to communicate with the foreign object instance and then this information may be compiled into the native metadata. Alternatively, the native metadata may communicate with the foreign object instance through the foreign metadata. The former technique has performance advantages over the latter method.

The created native metadata 32 is used with the class definition 4 to instantiate a first object instance 30 accessible via the created native metadata 32 that includes a reference 34 to the foreign object data 16 in the first foreign object instance 12. The reference 34 to the foreign object data 16 included in the first foreign object instance 12 is encapsulated within the first object instance 30 and may be accessed via an interface (the created native metadata 32) by other native objects. Because the class definition 4 works together with the mapping facility 6 which has records of the metadata for multiple types of foreign object systems, the same class definition may be used to directly and programmatically create objects that reference the foreign metadata for multiple types of foreign object systems. Thus, the mapping facility 6 may also create a second collection of native metadata 42 that corresponds to the foreign object metadata 24 for the second foreign object 22. The class definition 4 and the created native metadata 42 are used to instantiate a second native object instance 40 that is accessed via the created native metadata 42 and includes a reference 44 to the reference to the foreign object data 26 that was in the second foreign object instance 22. The reference 44 to the reference to the foreign object data 26 is encapsulated in the second object instance 40 and may be accessed by other native objects supported by the single language computing environment 2 via the created native metadata interface 42.

The mapping facility 6 enables the single language computing environment 2 to define subclasses of classes defined in the multiple different foreign object systems. Each subclass may inherit from one or more superclasses. The superclasses may include classes from the single language computing environment 2 and may also include classes from one or more different foreign object systems. The metadata for the subclass references metadata for each superclass. The metadata for the subclass contain instructions for how to access the data defined by each superclass. The subclass meta-data provide an interface to all data for all superclasses. The native environment does not need to know about how data is laid out in memory for the different superclasses and makes no assumptions about contiguity of object data. The native subclass can provide storage for each superclass to store a pointer to its superclass data. These pointers could refer to different offsets within a contiguous block of memory or to separate blocks of memory. Each pointer is interpreted by the superclass metadata. The pointers do not need to be memory pointers, but could also be file handles or other types of resource handles. Superclasses could be in different address spaces by belonging to different processes or be hosted on different machines. Although the terms subclass and superclass have been used herein, those skilled in the art will recognize that the native class and native metaclass may be thought of as base classes and that the foreign metaclass inheriting from the base classes may be referred to as a derived class.

Similarly, the mapping facility 6 may create a subclass in one or more foreign object systems, by creating a metaclass for the native class defined in the foreign object system. The native metaclass defines metadata describing how to access a collection of data defined by the native class and the foreign meta-data use the native meta-data to reflect the native class into the foreign object system. For example, methods defined in the foreign object system invoke methods in the native object system using a reference to the native object that is stored in the foreign object.

The meta-data may include:

meta-class—a container that contains meta-data for fields/properties, methods/functions, and events. Not all meta-classes will contain all such kinds of contained components. For example, Java has fields and methods, but no event meta-data in the core language. Instead, the Java Beans API may be used to get information about events. Microsoft .NET defines meta-fields, meta-properties, meta-events, and meta-methods. Both meta-fields and meta-properties may be mapped to MATLAB meta-properties. A meta-class also provides an API to instantiate an instance of the class and may be used to destroy an instance.

meta-field or meta-property—names the field or property, provides information about its type and provides an API to access and modify the field or property. A property is like a field in C++, except that access to the property may be controlled by functions defined in the language to perform tasks like ensuring that the value conforms to a specification or converting the input value into an internal representation.

meta-method or meta-function—names the method, provides information about the number, names, and types of input and output arguments, and provides an API to invoke the method on a particular argument list.

meta-event—names the event and provides information about what type of data is passed to an object responding to the event.

It will be appreciated that other types of metadata may also be found within the scope of the present invention and that the above listed types of metadata are illustrative types of meta-data but are not the exclusive types of metadata that may be used with embodiments of the present invention.

One embodiment of the present invention builds the native object system without any inherent assumptions about how object data is stored or managed within a computing device. Instead, the meta-data associated with the class definition specifies how to access object data. This extra level of indirection can impose a performance penalty. However, it is possible to avoid this penalty for native objects by optimizing the compilation of native language code creating and accessing native language objects. These optimizations can be performed using standard just-in-time compiler techniques such as those employed in MATLAB R14 where type analysis of variables is used to generate machine code with direct access to variables. When native language code accesses a foreign object, it may still be possible to optimize access to the data of the foreign object if the foreign object system can provide sufficient information about its objects. However, if the foreign object system cannot provide such information, the access is still accomplished using the same native language code without the language user needing to write different code.

Figure 2:
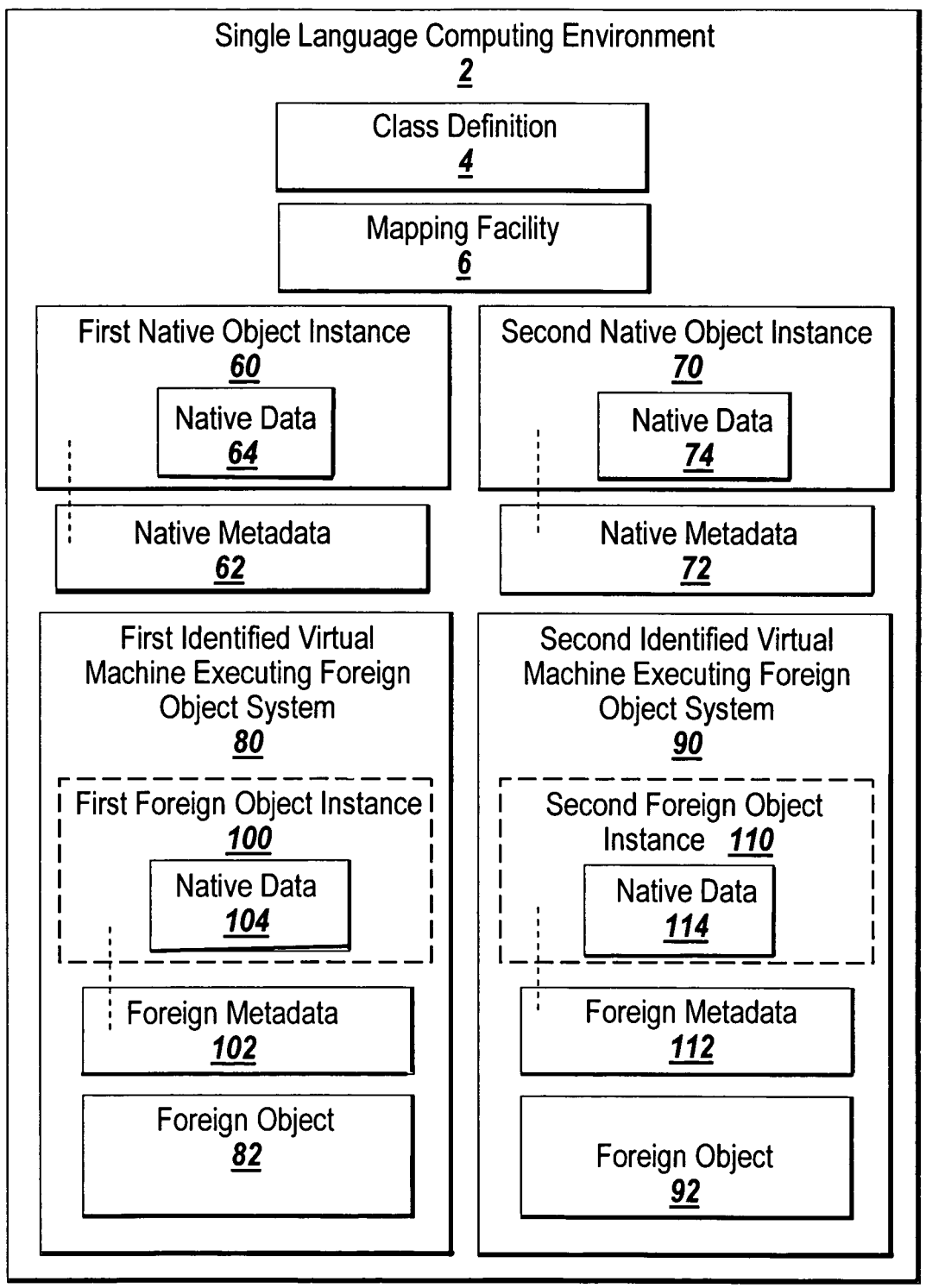
FIG. 2 depicts an environment suitable for practicing an illustrative embodiment of the present invention in order to programmatically instantiate foreign objects from native objects.

The mapping facility 6 of one embodiment of the present invention provides bidirectional mapping of metadata. FIG. 2 depicts an environment that may be used by an illustrative embodiment of the present invention to implement external interfaces for native objects so that the native objects may be utilized in foreign object systems. The single language computing environment 2 includes the class definition 4 and the mapping facility 6. The single language computing environment 2 also includes a first native object instance 60 and second native object instance 70. Both the first native object instance 60 and the second native object instance 70 include respective native data 64 and 74 and refer to respective native metadata 62 and 72. The single language computing environment 2 may load a first identified virtual machine executing a first foreign object system 80 and a second identified virtual machine executing a second type of foreign object system 90. The first identified virtual machine executing a foreign object system 80 may include a foreign object 82 and the second identified virtual machine executing a foreign object system 90 may include a foreign object 92.

The mapping facility 6 may be used to implement external interfaces for the first and second native object instances 60 and 70 so as to expose them to an identified foreign object system. For example, the mapping facility 6 may examine the native metadata 62 and create corresponding foreign metadata 102 for the identified first foreign object system 80. The newly created foreign metadata 102 and the class definition 4 are then used to instantiate a first object instance 100 that refers to the newly created foreign metadata 102 and includes a reference to native data 104. Similarly, the mapping facility 6 may examine the collection of native metadata 72 for the second native object instance 70 and create corresponding foreign metadata 112 for the identified second foreign object system 90. The newly created foreign metadata 112 and the class definition 4 are then used to instantiate a second object instance 110 that refers to the newly created foreign metadata 112 and includes a copy of the native data 114. The first object instance 100 and the second object instance 110 may then be provided to the respective foreign object systems 80 and 90 hosted by the first identified virtual machine and the second identified virtual machine. The newly created foreign metadata 102 referring to the first object instance 100 may be used by the foreign object instance 82 in the first identified virtual machine 80 to access the native data 104 in the first object instance. Similarly, the newly created foreign metadata 112 in the second object instance 110 may be used by the foreign object instance 92 in the second identified virtual machine 90 to access the native data 114 in the second object instance.

One embodiment of the present invention may also be practiced in a distributed environment. In the distributed environment the single language computing environment may receive foreign objects from external foreign object systems which a user wishes to utilize in a native object system supported by the single language computing environment. The external foreign object systems may or may not be hosted by an external virtual machine.

Figure 3:
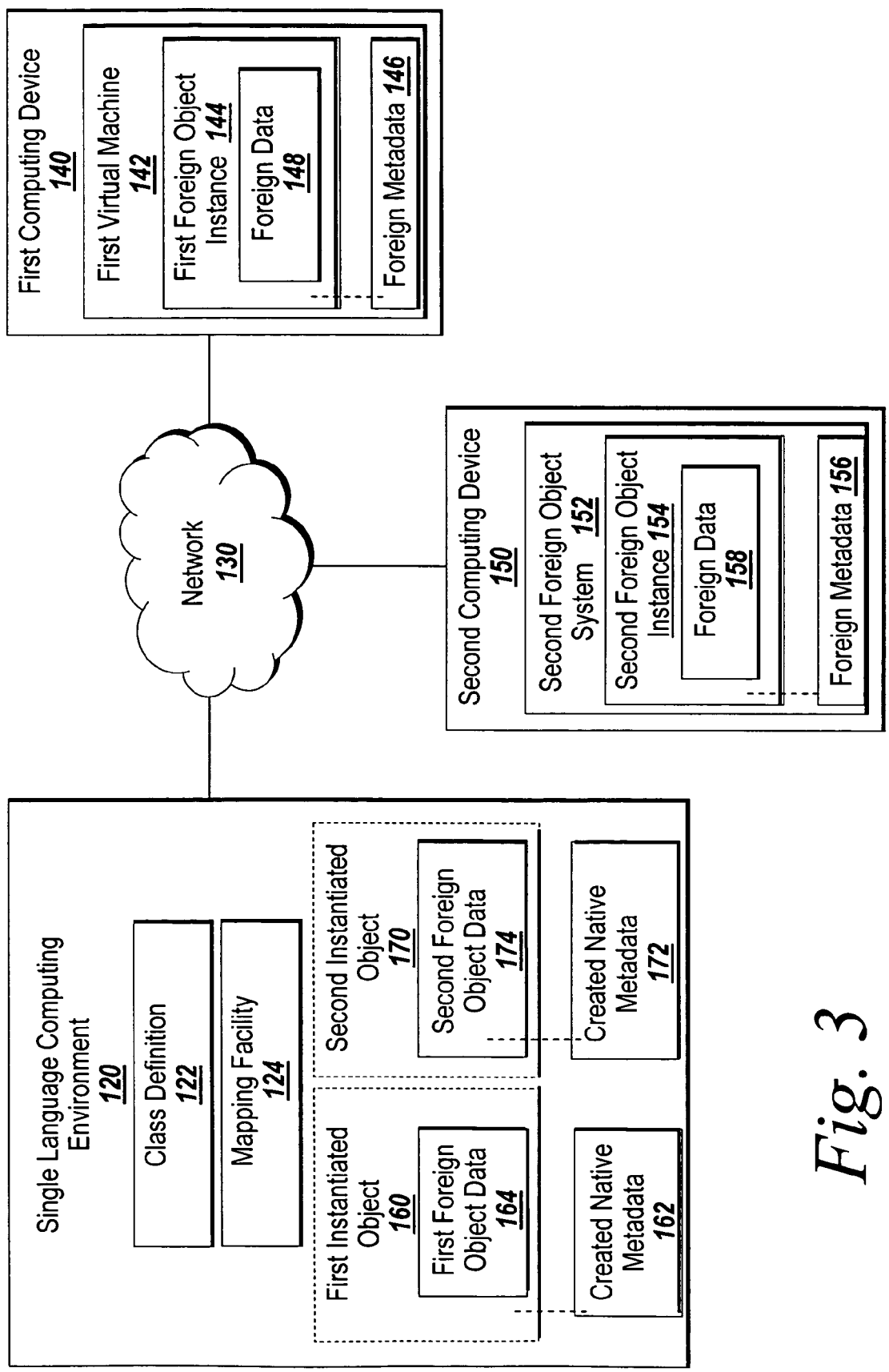
FIG. 3 depicts a distributed environment suitable for practicing an illustrative embodiment of the present invention where the foreign objects are transmitted over a network to the single language computing environment.

FIG. 3 depicts a distributed environment suitable for practicing an illustrative embodiment of the present invention. A single language computing environment 120 includes a class definition 122 and a mapping facility 124 of One embodiment of the present invention. The single language computing environment 120 is in communication over a network 130 with a first computing device 140 and a second computing device 150. The network may be a Local Area Network (LAN), a Wide Area Network (WAN), an intranet, the Internet, a wireless network or some other type of network allowing the single language computing environment 120 to communicate with distributed computing devices. The first computing device 140 hosts a first virtual machine 142 which is executing a first foreign object system that is used to instantiate a first foreign object instance 144. The first foreign object instance 144 refers to foreign metadata 146 which provides an interface to foreign data 148. The second computing device 150 directly executes a second foreign object system 152 (i.e.: the foreign object system is not executing in a virtual machine) that is used to instantiate a second foreign object instance 154. The second foreign object 154 refers to foreign metadata 156 which provides an interface to foreign data 158. The first foreign object instance 144 and the second foreign object instance 154 may be transmitted over the network 130 to the single language computing environment 120 where the class definition 122 and mapping facility 124 may be used to subclass the respective metaclasses for the first foreign object class and second foreign object class so as to expose the foreign object data 148 and 158 to objects created in the single language computing environment.

Continuing the discussion of FIG. 3, once the first foreign object instance 144 and second foreign object instance 154 have been transmitted over the network 130 to the single language computing environment 120, the mapping facility 124 creates corresponding native metadata 162 and 172 for each object in the manner discussed above. The mapping facility 124 creates new native metadata 162 that corresponds to the foreign metadata 146 of the first foreign object 144. The class definition 122 is then used to instantiate a first object 160 that refers to the newly created native metadata 162 and includes a reference to the first foreign object data 164. Similarly, the class definition 122 and the mapping facility 124 are used to instantiate a second object 170 that refers to created native metadata 172 corresponding to the foreign metadata 156 of the second foreign object instance 154. The second instantiated object 170 also includes a reference to foreign data 158 from the second foreign object instance 154. Native objects in the single language computing environment 120 may then use the native metadata interfaces 162 and 172 to access the respective copies of the foreign object data 164 and 174. It will be appreciated by those skilled in the art that although FIG. 3 has discussed transforming foreign object metadata so as to expose the foreign objects and their data in the native object system, the bidirectional capabilities of the class definition 122 and mapping facility 124 may also be used to expose the native objects to distributed foreign object systems consistent with the techniques discussed above with regard to FIG. 2.

Figure 4:
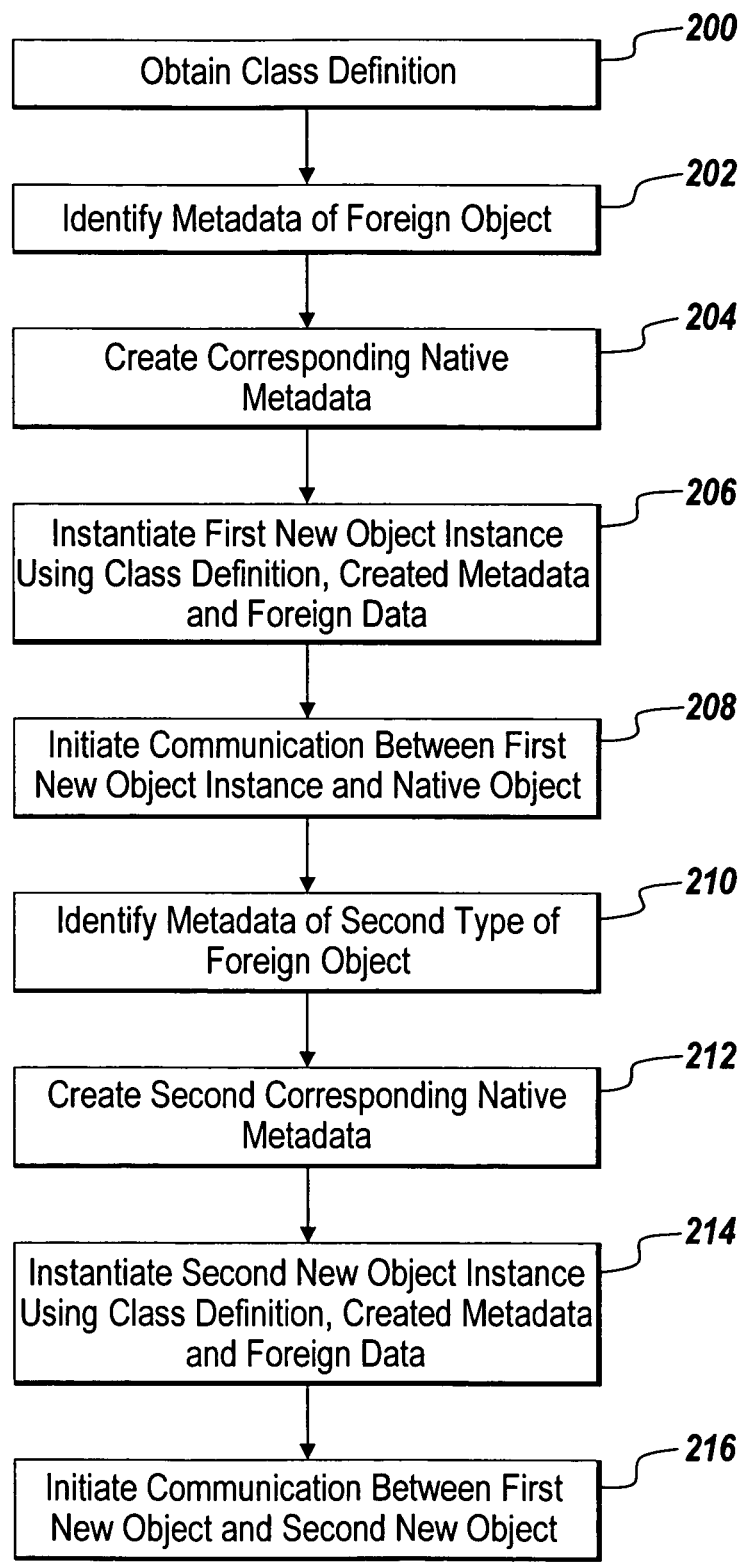
FIG. 4 is a flowchart of a sequence of steps followed by an embodiment of the present invention to create native objects from multiple types of foreign objects.

FIG. 4 is a flowchart of the sequence of steps followed by an illustrative embodiment of the present invention to directly subclass foreign objects so that they may be exposed to native objects supported by the single language computing environment 2. The sequence begins by obtaining the class definition 4 in the single language computing environment 4 (step 200). The class definition provides the syntax supporting the instantiation of objects accessible in multiple types of foreign object systems and the instantiation of objects accessible in the single language computing environment from objects created in multiple types of foreign object systems. The mapping facility 6 is then used to identify the object system associated with a foreign object's metadata (step 202). The mapping facility 6 then creates native metadata that corresponds to the foreign metadata (step 204). The native metadata is in a form recognized by objects instantiated from a native object system supported by the single language computing environment 2. It will be appreciated that the steps of identifying the foreign object metadata and the creation of the corresponding metadata that are discussed above as being performed by the mapping facility 6 may also be performed by two or more separate computer processes rather than being performed by a single process without departing from the scope of the present invention.

Once the mapping facility 6 has created the corresponding native metadata (step 204), a first new object is instantiated using the class definition 4, the created metadata and a copy of the foreign data from the foreign object (step 206). The created metadata provides an interface in the new object that allows communication to be initiated between other native objects and the new first object so that the other native objects can access the foreign data contained in the new object (step 208). The mapping facility may then identify the metadata of a second foreign object (step 210) from a different foreign object system and create corresponding native metadata (step 212). A second new object may then be instantiated using the class definition 4, the created native metadata and a copy of or reference to the foreign data from the second foreign object (step 214). Communication may then be initiated between the first new object and the second new object (step 216) using their respective created native metadata. In this manner, objects corresponding to objects originating in two different foreign object systems may communicate in a single language computing environment that supports a third object system.

Figure 5:
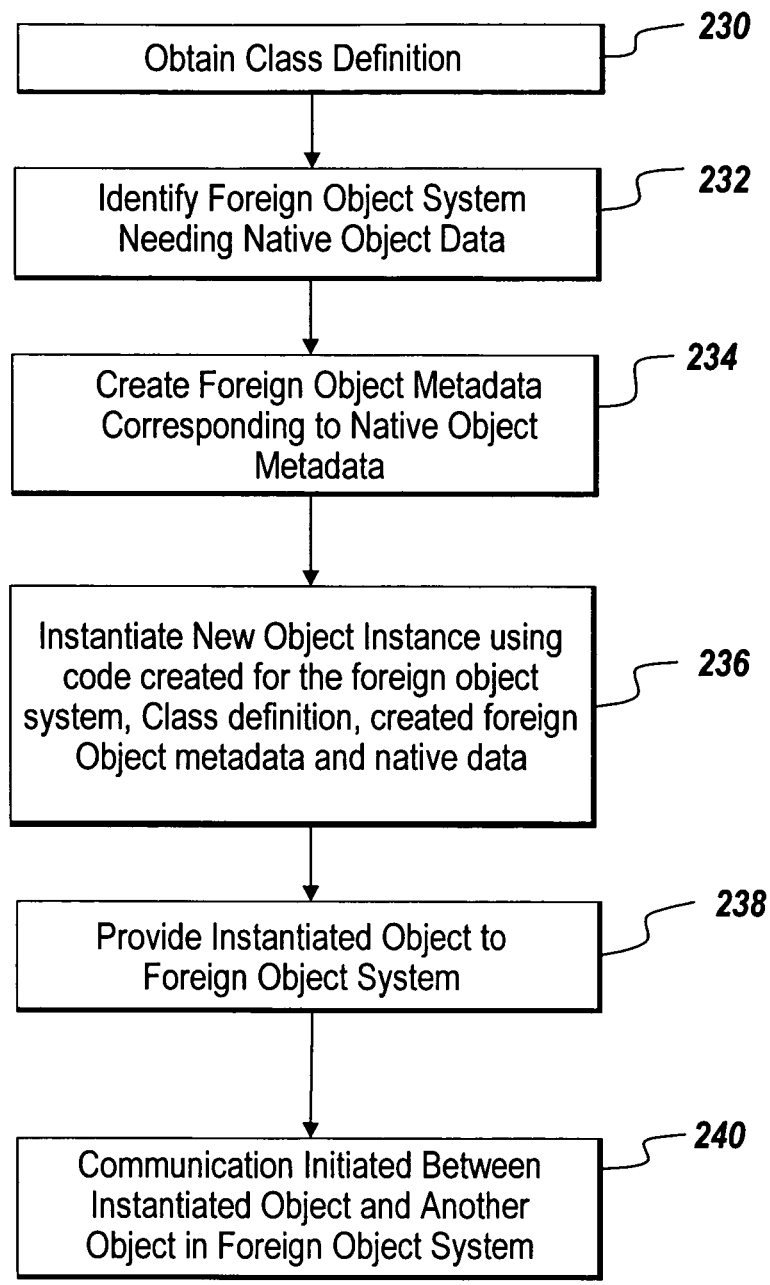
FIG. 5 is a flowchart of a sequence of steps followed by an embodiment of the present invention to create foreign objects using native object data.

As discussed above, one embodiment of the present invention may also be used to expose native objects to identified foreign objects instantiated from well-defined metadata systems. FIG. 5 is a flowchart of a sequence of steps that may be followed by an illustrative embodiment of the present invention to expose native objects to foreign object systems. The sequence begins by obtaining the class definition 4. (step 230). A foreign object system is identified as needing native object data (step 232). This identification may take place programmatically or as a result of a user indication. The mapping facility of one embodiment of the present invention creates foreign object metadata that corresponds to the native metadata of the native data object that is to be exposed to the foreign object system (step 234). The metadata defines an interface to the object's data. The mapping facility also creates code compatible with the foreign object system that can be executed by other code in the foreign object system to access the object in the native object system. The code created may be object code packaged into a Microsoft .NET Assembly, Java bytecode packaged in a Java class file or JAR file, or the code may be source code written in a language readable by the foreign object system. The code created may be contained in a file on disk that is read by the foreign object system or it may be created directly in memory if the foreign object system allows such code to be created in memory. For example Java provides an API that allows a Java class to be created in memory without creating a class file. When possible, it is generally better to avoid creating files on disk because disk access may be restricted and disk access generally takes more time than memory access.

Continuing the discussion of FIG. 5, a new object is instantiated using the code created for the foreign object system, the class definition, the created foreign object metadata and a copy of, or reference to the original native object data (step 236). The instantiated object may be provided to the foreign object system (step 238) where foreign objects can access the native object data using the interface provided by the created foreign metadata (step 240).

Figure 6:
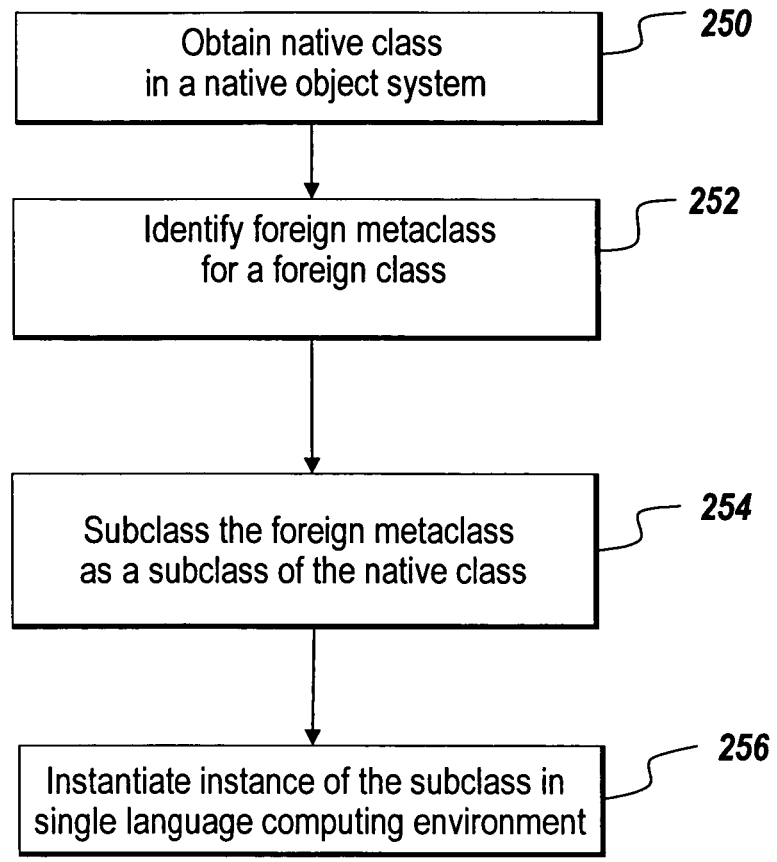
FIG. 6 is a flowchart of a sequence of steps followed by an embodiment of the present invention to subclass a foreign metaclass as a subclass of the native class.

The sequence of steps that may be followed by an illustrative embodiment of the present invention to subclass a foreign metaclass as a subclass of the native class is depicted in FIG. 6. The sequence begins with the obtaining of a native class in a native object system (step 250). A foreign metaclass for a foreign class created in a foreign object system is identified (step 252) and the identified foreign metaclass is then subclassed as a subclass of the native class in the manner discussed above (step 254) An instance of the subclass may then be instantiated in the single language computing environment (step 256).

Figure 7:
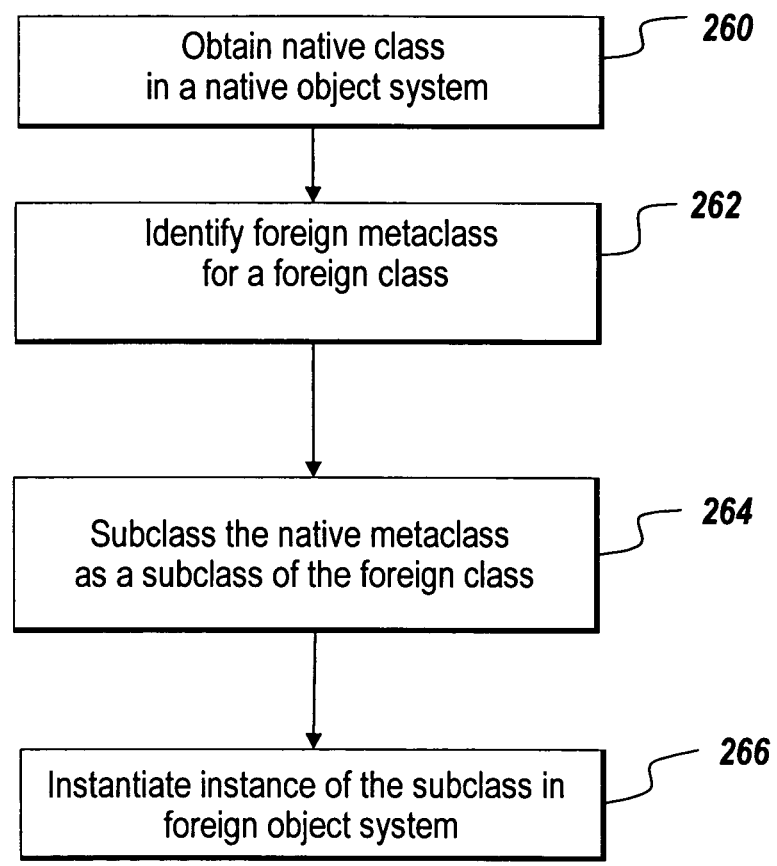
FIG. 7 is a flowchart of a sequence of steps followed by an embodiment of the present invention to subclass a native metaclass as a subclass of a foreign class.

The sequence of steps that may be followed by an illustrative embodiment of the present invention to subclass a native metaclass as a subclass of a foreign class in a foreign object system is depicted in FIG. 7. The sequence begins with the obtaining of a native class in a native object system (step 260). A foreign metaclass for a foreign class created in a foreign object system is identified (step 262) and the native metaclass is then subclassed as a subclass of the foreign class in the manner discussed above (step 264) An instance of the subclass may then be instantiated in the foreign object system (step 266).

One embodiment of the present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, or JAVA. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A computing device implemented method comprising:
   obtaining a class definition, wherein:
      the class definition is obtained in a single language computing environment,
      the single language computing environment has a native object system,
      the class definition is used to instantiate a plurality of objects from a plurality of classes,
      the plurality of objects are accessible in the single language computing environment,
      the plurality of classes are defined in a plurality of types of foreign object systems,
      the foreign object systems comprise a first foreign object system that is different than the native object system, and
      the first foreign object system is hosted in a virtual machine;
   examining a collection of foreign metadata of a foreign class, wherein:
      the foreign class is created in the first foreign object system, and
      the foreign metadata describes how to access an instance of the foreign class;
   creating, using a processor, single language computing environment metadata corresponding to the foreign metadata for the foreign class created in the first foreign object system, wherein:
      the single language computing environment metadata is in a form supported by the single language computing environment, and
      the single language computing environment metadata is general to the class definition so that the single language computing environment metadata is usable by the plurality of objects instantiated from the class definition; and
   instantiating a first object instance in the single language computing environment, wherein:
      the first object instance is instantiated using the class definition,
      the first object instance references the single language computing environment metadata, and
      the first object instance references the instance of the foreign class.

2. The method of claim 1, further comprising:
   providing a mapping facility in the single language computing environment, the mapping facility providing bidirectional mapping between the foreign metadata and the single language computing environment metadata.

3. The method of claim 1 wherein the foreign metadata describes how to access a first collection of data defined by the foreign class and at least one of:
   a second collection of data included in an instance of the foreign class, and
   a third collection of data referenced by an instance of the foreign class.

4. The method of claim 1, further comprising:
   examining second foreign class metadata, wherein:
      the second foreign class metadata is created in a second foreign object system,
      the second foreign object system is a different type of object system than the first foreign object system,
      the second foreign object system uses a different language than the single language computing environment, and
      the second foreign class metadata describes how to access data associated with an instance of a second foreign class;
   creating additional metadata, the additional metadata:
      corresponding to the second foreign class metadata, and
      created in a form supported by the single language computing environment; and
   instantiating an additional object in the single language computing environment using the class definition, the additional object referencing:
      the additional metadata, and
      the instance of the second foreign class.

5. The method of claim 4 wherein the second foreign object system is hosted in a virtual machine.

6. The method of claim 4, further comprising:
   initiating a communication between the additional object and the first object instance.

7. The method of claim 1, further comprising:
   initiating a communication between the first object instance and a native object created in the single language computing environment.

8. A system comprising:
   a storage device for storing:
      a class definition in a single language computing environment, wherein:

the single language computing environment has a
native object system,
the class definition is used to instantiate a plurality of
objects from a plurality of classes,
the plurality of object are accessible in the single
language computing environment,
the plurality of classes are defined in a plurality of
different types of foreign object systems,
the foreign object systems comprise a first foreign
object system, and
the first foreign object system is hosted in a virtual
machine;
a processor for executing instructions for:
implementing a mapping facility in the single language
computing environment,
bidirectionally mapping foreign metadata to single language computing environment metadata, wherein:
the foreign metadata is associated with foreign
objects created with the plurality of different types
of foreign object systems,
the single language computing environment metadata
is created in a form supported by the single language computing environment, and
the single language computing environment metadata
is usable by the plurality of objects instantiated
from the class definition,
examining the first foreign class metadata, wherein the
first foreign class metadata:
is metadata for a first foreign class,
is created in the first foreign object system, and
describes how to access an instance of the foreign
object system,
creating new first foreign class metadata, the new first
foreign class metadata:
corresponding to the first foreign class metadata, and
created in a form supported by the single language
computing environment, and
instantiating a first object instance, the first object
instance:
instantiated using the class definition, and
referencing the new first foreign class metadata and
the instance of the foreign class.

9. The system of claim 8 wherein the mapping facility
examines a second collection of metadata, wherein:
the second collection of metadata is for a second foreign
class,
the second foreign class is created in a second type of
foreign object system,
the second collection of metadata describes how to access
second foreign object instance data,
the second foreign object instance data is associated with a
second foreign object instance from the second foreign
class, and
the mapping facility creates second foreign class metadata
corresponding to the second collection of metadata, the
second foreign class metadata created in a form supported by the single language computing environment;
and further comprising:
a second object instance, the second object instance:
instantiated using the class definition, and
referencing the second foreign class metadata and the
second foreign object instance.

10. The system of claim 9 wherein a communication is
initiated in the single language computing environment
between the first object instance and the second object
instance.

11. The system of claim 9, further comprising:
a virtual machine hosting one of the foreign object system
and the second type of foreign object system.

12. The system of claim 9, further comprising:
a first virtual machine hosting the first foreign object system; and
a second virtual machine hosting the second type of foreign
object system.

13. The system of claim 8, further comprising:
a plurality of virtual machines loaded in the single language computing environment, each virtual machine
hosting a different foreign object system.

14. A system comprising:
a storage device for storing:
a class definition, wherein:
the class definition is in a single language computing
environment,
the single language computing environment has a
native object system,
the class definition is used to instantiate a plurality of
objects,
the plurality of objects are accessible in a plurality of
different types of foreign object systems,
the foreign object systems comprise a first foreign
object system, and
the first foreign object system is hosted in a virtual
machine;
a processor for executing instructions for:
implementing a mapping facility in the single language
computing environment,
bidirectionally mapping foreign metadata to single language computing environment metadata, wherein:
the foreign metadata is associated with objects created with the plurality of different types of foreign
object systems, and
the single language computing environment metadata
is created in a form supported by the single language computing environment,
examining native object class metadata, wherein
the native object class metadata is for a native object
class created in the single language computing
environment, and
the native object class metadata describes how to
access an instance of the native object class,
creating native metadata corresponding to the native
object class metadata, the native metadata:
created in a form supported by the first foreign object
system, and
being general to the class definition, and
instantiating a first foreign object instance, wherein:
the first foreign object instance is in a form supported
by the first foreign object system,
the first foreign object instance is instantiated using
the class definition, and
the first foreign object instance references the native
metadata and an instance of the native object class.

15. The system of claim 14 wherein the mapping facility
creates a second collection of metadata corresponding to the
native object class metadata, the second collection of metadata created in a form supported by a second type of foreign
object system, and wherein the system further comprises:
a second foreign object instance, the second foreign object
instance instantiated using the class definition and referencing:
the second collection of metadata, and
a collection of data associated with the instance of the
native object class.

16. The system of claim 15, further comprising:
a virtual machine hosting the second type of foreign object system.

17. The system of claim 15, further comprising:
a first virtual machine hosting the first foreign object system; and
a second virtual machine hosting the second type of foreign object system.

18. A non-transitory computer readable medium holding computer-executable instructions that, when executed by a processor, cause the processor to:
obtain a class definition, wherein:
the class definition is obtained in a single language computing environment,
the single language computing environment has a native object system,
the class definition is used to instantiate a plurality of objects from a plurality of classes,
the plurality of objects are accessible in the single language computing environment,
the plurality of classes are defined in a plurality of types of foreign object systems,
the foreign object systems comprise a first foreign object system that is different than the native object system, and
the first foreign object system is hosted in a virtual machine;
examine a collection of foreign metadata of a foreign class, wherein:
the foreign class is created in the first foreign object system, and
the foreign metadata describes how to access an instance of the foreign class;
create single language computing environment metadata corresponding to the foreign metadata for the foreign class created in the first foreign object system, wherein:
the single language computing environment metadata is in a form supported by the single language computing environment, and
the single language computing environment metadata is general to the class definition so that the single language computing environment metadata is usable by the plurality of objects instantiated from the class definition; and
instantiate a first object instance in the single language computing environment, wherein:
the first object instance is instantiated using the class definition,
the first object instance references the single language computing environment metadata, and
the first object instance references the instance of the foreign class.

* * * * *